United States Patent
Morii et al.

(10) Patent No.: US 9,656,554 B2
(45) Date of Patent: May 23, 2017

(54) VEHICLE AND CONTROL DEVICE FOR VEHICLE

(71) Applicants: Akiyoshi Morii, Obu (JP); Tetsuya Nomura, Obu (JP); Makoto Nakamura, Okazaki (JP); Mikio Yamazaki, Toyota (JP)

(72) Inventors: Akiyoshi Morii, Obu (JP); Tetsuya Nomura, Obu (JP); Makoto Nakamura, Okazaki (JP); Mikio Yamazaki, Toyota (JP)

(73) Assignees: TOYOTA JIDOSHA KABUSHIKI KAISHA, Toyota-Shi (JP); DENSO CORPORATION, Kariya-Shi (JP)

( * ) Notice: Subject to any disclaimer, the term of this patent is extended or adjusted under 35 U.S.C. 154(b) by 720 days.

(21) Appl. No.: 14/136,464

(22) Filed: Dec. 20, 2013

(65) Prior Publication Data

US 2014/0175872 A1    Jun. 26, 2014

(30) Foreign Application Priority Data

Dec. 25, 2012   (JP) ................. 2012-280918

(51) Int. Cl.
| | |
|---|---|
| *B60L 1/00* | (2006.01) |
| *B60L 3/00* | (2006.01) |
| *H02G 3/00* | (2006.01) |
| *B60L 7/14* | (2006.01) |

(Continued)

(52) U.S. Cl.
CPC ................. *B60L 7/14* (2013.01); *B60L 11/14* (2013.01); *B60L 11/1803* (2013.01);

(Continued)

(58) Field of Classification Search
CPC .. B60L 11/08; B60L 7/14; B60L 11/00; B60L 2210/40; H02P 21/0021; Y02T 10/643; Y02T 10/64
See application file for complete search history.

(56) References Cited

U.S. PATENT DOCUMENTS

2006/0006825 A1* 1/2006 Inaguma ................. H02P 21/22
                                                                318/432
2007/0278986 A1* 12/2007 Okamura ............... B60K 6/365
                                                                318/798

(Continued)

FOREIGN PATENT DOCUMENTS

| CN | 101461130 A | 6/2009 |
| CN | 102481859   | 5/2012 |

(Continued)

*Primary Examiner* — Rexford Barnie
*Assistant Examiner* — Rasem Mourad
(74) *Attorney, Agent, or Firm* — Andrews Kurth Kenyon LLP (57) ABSTRACT

On a vehicle, a converter converting and outputting a voltage, an inverter converting DC power output from the converter to AC power, and a motor driven by AC power supplied from the inverter are mounted. A control device calculates a requested voltage VHreq as an output voltage from a converter for bringing a degree of modulation Kmd of the inverter closer to a prescribed target degree of modulation Kmd#, calculates from target torque of the motor, a minimum voltage VHmin as a minimum value for an output voltage from the converter which can realize target torque of the motor, and controls the converter such that the output voltage VH from the converter is closer to a value which is greater one of the requested voltage VHreq and the minimum voltage VHmin.

10 Claims, 8 Drawing Sheets

(51) Int. Cl.
*B60L 11/14* (2006.01)
*B60L 11/18* (2006.01)
*B60L 15/00* (2006.01)
*B60L 15/02* (2006.01)
*B60L 15/20* (2006.01)

(52) U.S. Cl.
CPC ......... *B60L 11/1864* (2013.01); *B60L 15/007* (2013.01); *B60L 15/025* (2013.01); *B60L 15/2009* (2013.01); *B60L 2210/14* (2013.01); *B60L 2210/40* (2013.01); *B60L 2240/421* (2013.01); *B60L 2240/423* (2013.01); *B60L 2240/547* (2013.01); *B60L 2240/549* (2013.01); *B60L 2250/26* (2013.01); *Y02T 10/643* (2013.01); *Y02T 10/70* (2013.01); *Y02T 10/7005* (2013.01); *Y02T 10/7061* (2013.01); *Y02T 10/7077* (2013.01); *Y02T 10/7225* (2013.01); *Y02T 10/7241* (2013.01); *Y02T 10/7275* (2013.01)

(56) References Cited

U.S. PATENT DOCUMENTS

2009/0146589 A1* 6/2009 Hattori ............... H02P 21/05
 318/400.02
2011/0248663 A1* 10/2011 Yamakawa ............. B60L 11/08
 318/805
2012/0173066 A1 7/2012 Yamada et al.

FOREIGN PATENT DOCUMENTS

| JP | 2006-311768 A | | 11/2006 |
| JP | 2006311768 A | * | 11/2006 |
| JP | 2007-325351 A | | 12/2007 |
| JP | 2008211887 A | | 9/2008 |
| JP | 2010252488 A | | 11/2010 |
| JP | 2011061921 A | | 3/2011 |
| JP | 2011160546 A | | 8/2011 |

* cited by examiner

| CONTROL SCHEME | SINE WAVE PWM | OVERMODULATION PWM | RECTANGULAR WAVE (1 PULSE) |
|---|---|---|---|
| WAVEFORM OF OUTPUT VOLTAGE FROM INVERTER | FUNDAMENTAL WAVE COMPONENT | FUNDAMENTAL WAVE COMPONENT | FUNDAMENTAL WAVE COMPONENT |
| DEGREE OF MODULATION | 0~0.61 | 0.61~0.78 | 0.78 |
| CHARACTERISTIC | SMALL TORQUE FLUCTUATION | IMPROVEMENT IN OUTPUT IN INTERMEDIATE-SPEED REGION | IMPROVEMENT IN OUTPUT IN HIGH-SPEED REGION |
| SWITCHING LOSS AT THE SAME VOLTAGE · CURRENT | GREAT | INTERMEDIATE | SMALL |

VEHICLE AND CONTROL DEVICE FOR VEHICLE

This nonprovisional application is based on Japanese Patent Application No. 2012-280918 filed on Dec. 25, 2012 with the Japan Patent Office, the entire contents of which are hereby incorporated by reference.

BACKGROUND OF THE INVENTION

Field of the Invention

The present invention relates to a control device for a vehicle, and particularly to a technique for controlling an output voltage from a converter in a vehicle incorporating a motor driven by electric power supplied through a converter and an inverter.

Description of the Background Art

A hybrid car, a fuel cell car, and an electric car which incorporate an electric motor as a drive source have been known. For example, a three-phase AC motor is employed as the electric motor. Such an electric motor is supplied with AC power from an inverter.

Various techniques can be used for controlling an inverter. By way of example of a technique used for controlling an inverter, Japanese Patent Laying-Open No. 2006-311768 discloses maintaining a degree of modulation in voltage conversion by an inverter at a target value.

SUMMARY OF INVENTION

A degree of modulation of an inverter is represented by a value obtained by dividing an output voltage by an input voltage. Therefore, if an actual degree of modulation is smaller than a target value, an input voltage to the inverter, that is, an output voltage from a converter connected to the inverter, may be lowered.

When an output voltage from the converter is lowered, however, a voltage supplied to an electric motor is also consequently lowered. Therefore, a maximum value for torque which can be output by the electric motor also lowers. Accordingly, there may be a case that a vehicle cannot obtain acceleration and a request from a driver cannot be met.

The present invention was made in view of the problems described above, and an object thereof is to overcome insufficient output torque from a motor.

According to an aspect of the present invention, a vehicle includes a converter converting and outputting a voltage, an inverter converting DC power output from the converter to AC power, a motor driven by AC power supplied from the inverter, and a control device configured to control the converter and the inverter. The control device calculates a requested voltage as an output voltage from the converter for bringing a degree of modulation of the inverter closer to a prescribed target degree of modulation, calculates from target torque of the motor, a minimum voltage as a minimum value for the output voltage from the converter which can realize target torque of the motor, and controls the converter such that the output voltage from the converter is closer to a value which is greater one of the requested voltage and the minimum voltage.

According to another aspect of the present invention, a vehicle incorporates a converter converting and outputting a voltage, an inverter converting DC power output from the converter to AC power, and a motor driven by AC power supplied from the inverter. A control device for the vehicle includes first calculation means for calculating a requested voltage as an output voltage from the converter for bringing a degree of modulation of the inverter closer to a prescribed target degree of modulation, second calculation means for calculating from target torque of the motor, a minimum voltage as a minimum value of the output voltage from the converter which can realize target torque of the motor, and control means for controlling the converter such that the output voltage from the converter is closer to a value which is greater one of the requested voltage and the minimum voltage.

When a minimum voltage as a minimum value for an output voltage from the converter which can realize target torque of the motor is higher than a requested voltage as the output voltage from the converter for bringing a degree of modulation of the inverter closer to a target degree of modulation, the output voltage from the converter is brought closer to the minimum voltage, rather than to the requested voltage. Therefore, lowering in the output voltage from the converter down to a value which cannot realize target torque of the motor can be prevented. Thus, insufficient output torque of the motor can be overcome.

The requested voltage as the output voltage from the converter for maintaining a degree of modulation of the inverter at a prescribed degree of modulation may repeatedly be calculated by adding a proportional term and an integral term of feedback control to a necessary voltage calculated from the target torque of the motor as the output voltage from the converter necessary for realizing target torque of the motor. In this case, when the requested voltage is higher than the minimum voltage, a next requested voltage may be calculated by using a value calculated from the minimum voltage as the integral term. Namely, when the output voltage from the converter is brought closer to the minimum voltage rather than to the requested voltage, an integral term of feedback control for calculating the requested voltage may be determined by using the minimum voltage. More specifically, a next requested voltage may be calculated by using a value obtained by subtracting the necessary voltage and the proportional term from the minimum voltage as the integral term. Thus, even though the requested voltage is not used as the target value, the requested voltage can be calculated in consideration of a voltage actually used as the target value.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter in detail with reference to the drawings. It is noted that the same or corresponding elements in the drawings below have the same reference characters allotted and description thereof will not be repeated in principle.

Figure 1:
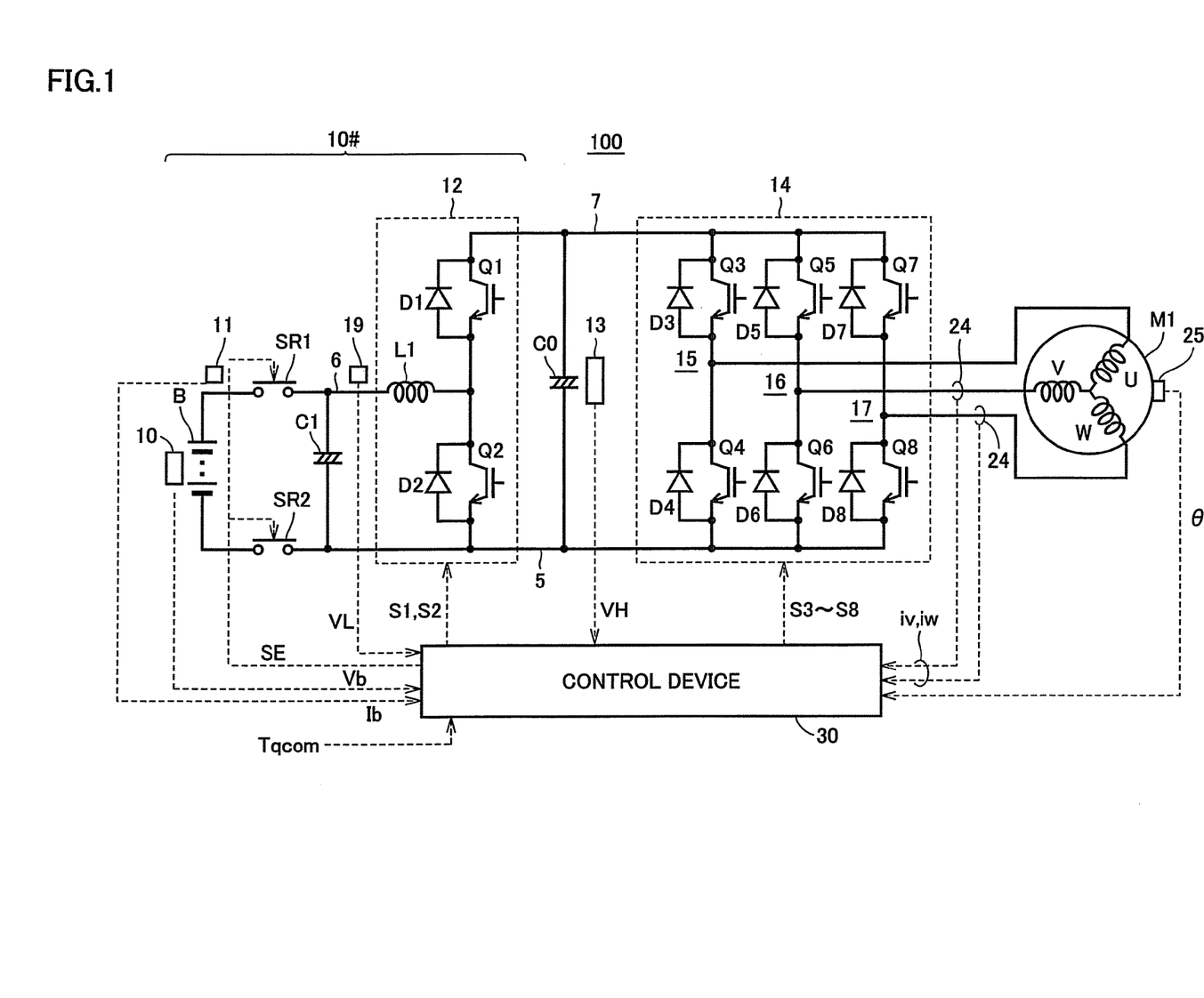
FIG. 1 is a diagram of an overall configuration of a motor drive system.

FIG. 1 is a diagram of an overall configuration of a control system 100 for an AC electric motor mounted as a drive source on a vehicle. Control system 100 includes a DC voltage generation portion 10#, a smoothing capacitor C0, an inverter 14, an AC electric motor M1, and a control device 30.

AC electric motor M1 is, for example, a traction motor for running configured to generate torque in a drive wheel of an electrically-powered vehicle (comprehensively expressing a car capable of generating vehicle driving force with electric energy, such as a hybrid car, an electric car, and a fuel cell car). Alternatively, this AC electric motor M1 may be configured to have a function as a generator driven by an engine and may be configured to function as both of an electric motor and a generator. Namely, in the present embodiment, the AC electric motor includes a motor generator. In addition, for example, AC electric motor M1 may be incorporated in a hybrid car as a component being able to start the engine.

DC voltage generation portion 10# includes a DC power supply B, system relays SR1, SR2, a smoothing capacitor C1, and a boost converter 12.

DC power supply B is implemented representatively by such a rechargeable power storage device as a secondary battery such as a nickel metal hydride battery or a lithium ion battery, and an electric double layer capacitor. A DC voltage Vb output from DC power supply B and an input and output DC current Ib are sensed by a voltage sensor 10 and a current sensor 11, respectively.

System relay SR1 is connected between a positive electrode terminal of DC power supply B and a power line 6, and system relay SR2 is connected between a negative electrode terminal of DC power supply B and a power line 5. System relay SR1, SR2 is turned on/off by a signal SE from control device 30.

Boost converter 12 includes a reactor L1, power semiconductor switching elements Q1, Q2, and diodes D1, D2. Power semiconductor switching elements Q1 and Q2 are connected in series between a power line 7 and power line 5. On and off of power semiconductor switching elements Q1 and Q2 is controlled by switching control signals S1 and S2 from control device 30.

In this embodiment of the invention, an IGBT (Insulated Gate Bipolar Transistor), a power MOS (Metal Oxide Semiconductor) transistor, a power bipolar transistor, or the like can be employed as the power semiconductor switching element (hereinafter simply referred to as a "switching element"). Anti-parallel diodes D1, D2 are arranged for switching elements Q1, Q2, respectively. Reactor L1 is connected between a connection node of switching elements Q1 and Q2 and power line 6. In addition, smoothing capacitor C0 is connected between power line 7 and power line 5.

Smoothing capacitor C0 smoothes a DC voltage of power line 7. A voltage sensor 13 detects a voltage across opposing ends of smoothing capacitor C0, that is, a DC voltage VH on power line 7. DC voltage VH corresponding to a DC link voltage of inverter 14 will hereinafter also be referred to as a "system voltage VH." On the other hand, a DC voltage VL of power line 6 is detected by a voltage sensor 19. DC voltages VH, VL detected by voltage sensors 13, 19, respectively, are input to control device 30.

Inverter 14 is constituted of upper and lower arms 15 of a U-phase, upper and lower arms 16 of a V-phase, and upper and lower arms 17 of a W-phase, provided in parallel between power line 7 and power line 5. The upper and lower arms of each phase are constituted of switching elements connected in series between power line 7 and power line 5. For example, upper and lower arms 15 of the U-phase are constituted of switching elements Q3, Q4, upper and lower arms 16 of the V-phase are constituted of switching elements Q5, Q6, and upper and lower arms 17 of the W-phase are constituted of switching elements Q7, Q8. In addition, anti-parallel diodes D3 to D8 are connected to switching elements Q3 to Q8, respectively. On and off of switching elements Q3 to Q8 is controlled by switching control signals S3 to S8 from control device 30, respectively.

Representatively, AC electric motor M1 is a three-phase permanent magnet type synchronous electric motor, and it is constituted such that one ends of three coils of the U-, V-, and W-phases are commonly connected to a neutral point. In addition, the other ends of the coils of respective phases are connected to intermediate points of switching elements of upper and lower arms 15 to 17 of respective phases.

Boost converter 12 is basically controlled such that switching elements Q1 and Q2 are complementarily and alternately turned on and off in each switching cycle corresponding to one cycle of a carrier wave used for PWM control. Boost converter 12 can control a boost ratio (VH/VL) by controlling a ratio between ON periods (a duty ratio) of switching elements Q1, Q2. Therefore, on and off of switching elements Q1, Q2 is controlled in accordance with a duty ratio operated in accordance with detection values of DC voltages VL, VH and a voltage command value VH#.

By complementarily turning on and off switching element Q1 and switching element Q2, charging and discharging of DC power supply B can both be addressed without switching control in accordance with a direction of a current through reactor L1. Namely, through control of system voltage VH in accordance with voltage command value VH#, boost converter 12 can address both of regeneration and power running.

It is noted that, while output from AC electric motor M1 is low, AC electric motor M1 can be controlled in a state of VH=VL (a boost ratio=1.0) without boost by boost converter 12. In this case (hereinafter "also referred to as a non-boost mode"), switching elements Q1 and Q2 are fixed to on and off, respectively, and hence electric power loss in boost converter 12 is lowered.

In a case where a torque command value of AC electric motor M1 is positive (Tqcom>0), when a DC voltage is supplied from smoothing capacitor C0, inverter 14 converts the DC voltage through a switching operation of switching elements Q3 to Q8 in response to switching control signals S3 to S8 from control device 30 and drives AC electric motor M1 so as to output positive torque. Alternatively, in a case where a torque command value of AC electric motor M1 is zero (Tqcom=0), inverter 14 converts a DC voltage to an AC voltage through a switching operation in response to switching control signals S3 to S8 and drives AC electric motor M1 such that torque attains to zero. Thus, AC electric motor M1 is driven to generate zero or positive torque designated by a torque command value Tqcom.

In addition, during regenerative braking of an electrically-powered vehicle incorporating control system 100, torque command value Tqcom of AC electric motor M1 is set to negative (Tqcom<0). In this case, inverter 14 converts an AC voltage generated by AC electric motor M1 to a DC voltage through a switching operation in response to switching control signals S3 to S8, and supplies the resultant DC voltage (system voltage VH) to boost converter 12 through smoothing capacitor C0.

It is noted that regenerative braking herein includes braking accompanying regeneration when a driver driving an electrically-powered vehicle operates a foot brake, and deceleration (or stop of acceleration) of a vehicle while carrying out regeneration, in which an accelerator pedal is off during running although a foot brake is not operated.

A current sensor 24 detects a current (a phase current) which flows through AC electric motor M1 and outputs the detection value to control device 30. It is noted that, since the sum of instantaneous values for three-phase currents iu, iv, iw is zero, the current sensors may be arranged to detect motor currents of two phases as shown in FIG. 1 (for example, a V-phase current iv and a W-phase current iw).

A rotation angle sensor (resolver) 25 detects an angle of rotation β of a rotor of AC electric motor M1, and sends detected angle of rotation θ to control device 30. Control device 30 can calculate a rotation speed Nmt and a rotation angle velocity ω of AC electric motor M1 based on angle of rotation θ. It is noted that rotation angle sensor 25 does not have to be arranged, by directly operating angle of rotation θ based on a motor voltage or a current in control device 30.

Control device 30 is configured with an electronic control unit (ECU) and it controls an operation of control system 100 through software processing in which a not-shown CPU (Central Processing Unit) executes a program stored in advance and/or through hardware processing using dedicated electronic circuitry.

As a representative function, control device 30 controls an operation of boost converter 12 and inverter 14 such that AC electric motor M1 outputs torque in accordance with torque command value Tqcom with a control scheme which will be described later, based on input torque command value Tqcom, DC voltage Vb detected by voltage sensor 10, DC current Ib detected by current sensor 11, system voltage VH detected by voltage sensor 13 and motor currents iv, iw detected by current sensor 24, angle of rotation θ from rotation angle sensor 25, and the like.

Namely, in order to control DC voltage VH in accordance with voltage command value VH# as above, control device 30 generates switching control signals S1, S2 for boost converter 12. In addition, control device 30 generates control signals S3 to S8 for controlling output torque from AC electric motor M1 in accordance with torque command value Tqcom. Control signals S1 to S8 are input to boost converter 12 and inverter 14.

Torque command value Tqcom is calculated in accordance with a map having an accelerator position, a vehicle speed, and the like as parameters.

Figure 2:
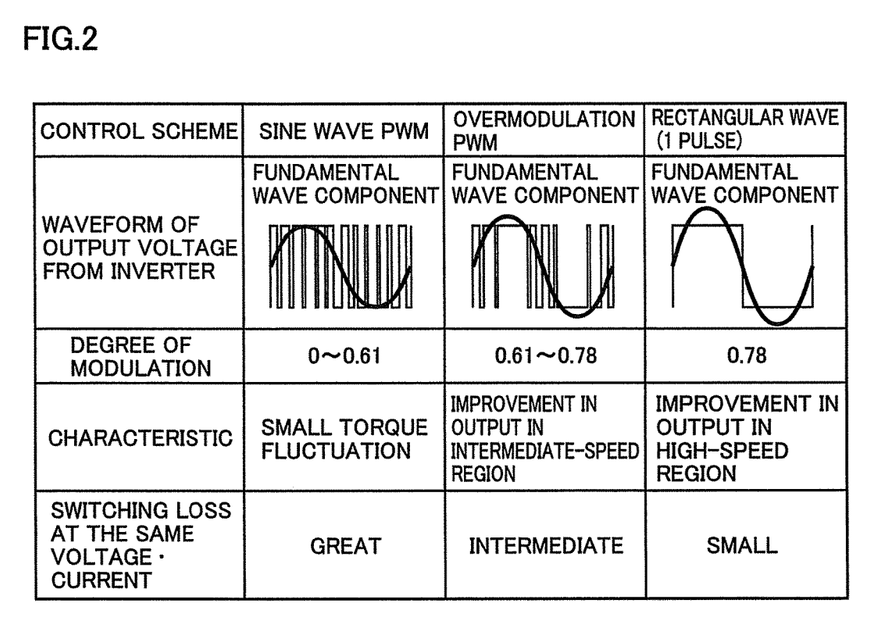
FIG. 2 is a diagram illustrating a control scheme employed in the motor drive system.

FIG. 2 is a diagram illustrating an inverter control scheme for controlling the AC electric motor. As shown in FIG. 2, in the control system for the AC electric motor according to the embodiment of the present invention, three control schemes are switched for use for control of an AC electric motor by inverter 14.

Sine wave PWM control is used as general PWM control, in which on and off of a switching element in the arm of each phase is controlled based on voltage comparison between a sinusoidal voltage command value and a carrier wave (representatively, a triangular wave). Consequently, regarding a set of a high-level period corresponding to an ON period of an element in the upper arm and a low-level period corresponding to an ON period of an element in the lower arm, a duty ratio is controlled such that a fundamental wave component thereof exhibits a sine wave within a certain period.

Hereinafter, a ratio of a voltage (an effective value of a line voltage) applied to AC electric motor M1 to system voltage VH in DC-AC voltage conversion by an inverter will herein be defined as a "degree of modulation." Limit of application of sine wave PWM control is basically reached by a state where AC voltage amplitude (a phase voltage) of each phase is equal to system voltage VH. Namely, in sine wave PWM control, a degree of modulation can be increased only up to 0.61.

On the other hand, in rectangular wave voltage control, an inverter outputs one pulse of a rectangular wave having a ratio between a high-level period and a low-level period of 1:1 within a period corresponding to 360 degrees of an electric angle of the electric motor. Thus, a degree of modulation is raised up to 0.78.

Overmodulation PWM control refers to control for carrying out PWM control the same as sine wave PWM control above for a voltage command value (sinusoidal) greater in amplitude than a carrier wave, with that amplitude being increased. Consequently, by distorting a fundamental wave component, a degree of modulation can be raised to a range from 0.61 to 0.78.

In control system 100 for AC electric motor M1 according to the present embodiment, in accordance with a state of AC electric motor M1, sine wave PWM control, overmodulation PWM control, and rectangular wave voltage control described above are selectively applied.

Figure 3:
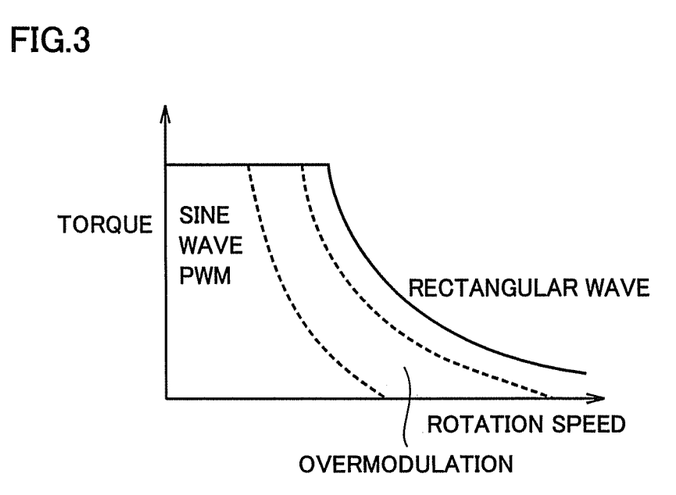
FIG. 3 is a diagram showing an operation region in which each of sine wave PWM control, overmodulation PWM control, and rectangular wave control is employed.

Generally, as shown in FIG. 3, sine wave PWM control is selected in a low-speed rotation region to an intermediate-speed rotation region, overmodulation control is selected in the intermediate-speed rotation region to a high-speed rotation region, and rectangular wave voltage control is selected in a higher-speed rotation region. A specific method for selecting a control scheme will be described later.

Figure 4:
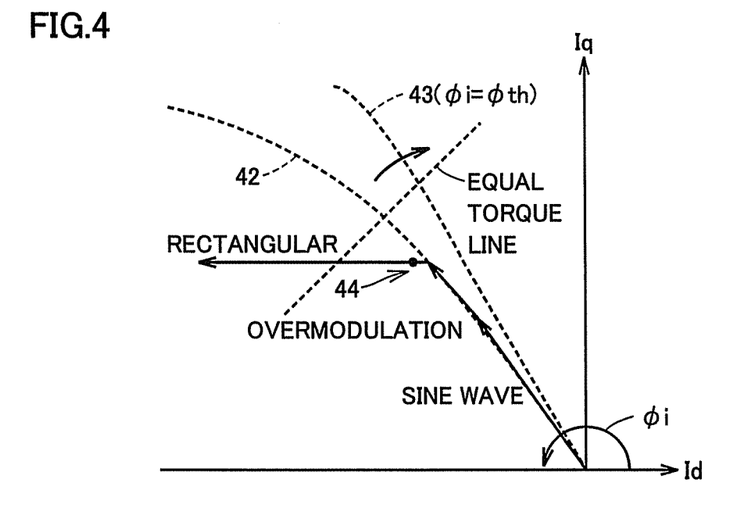
FIG. 4 is a diagram showing a current vector of an AC electric motor.

As shown in FIG. 4, in sine wave PWM control and overmodulation PWM control, motor current control by inverter 14 is carried out such that a current phase φi of AC electric motor M1 is located on an optimal current advance line 42. The abscissa in FIG. 4 represents a d-axis current Id and the ordinate in FIG. 4 represents a q-axis current Iq.

Optimal current advance line 42 is drawn as a set of current phase points at which loss in AC electric motor M1 on an equal torque line on an Id-Iq plane serves as a reference. Therefore, current command values Idcom, Iqcom on the d-axis and the q-axis are generated so as to correspond to a point of intersection between the equal torque line corresponding to torque command value Tqcom for AC electric motor M1, which is determined in accordance with the map having an accelerator position, a vehicle speed, and the like as parameters and optimal current advance line 42. The optimal current advance line can be found through experiments or simulation in advance. Therefore, a map determining combination of current command values Idcom, Iqcom on optimal current advance line 42 in correspondence with each torque command value can be created in advance and stored in control device 30.

FIG. 4 shows with an arrow, a trace along which a position of a tip end of a current vector (a current phase) resulting from combination of Id, Iq having a zero point position as an origin varies with increase in output torque. With increase in output torque, magnitude of a current (corresponding to magnitude of a current vector on the Id-Iq plane) increases. As described above, in sine wave PWM control and overmodulation PWM control, a current phase is controlled to be located on optimal current advance line 42 by setting of current command values Idcom, Iqcom.

When a torque command value further increases and a degree of modulation reaches 0.78, rectangular wave voltage control is applied.

In rectangular wave voltage control, inverter 14 cannot directly control a current phase of AC electric motor M1. Since field-weakening control is carried out in rectangular wave voltage control, output torque increases as a voltage phase ϕv is made greater. Accordingly, an absolute value of d-axis current Id which is a field current increases. Consequently, a position of the tip end of the current vector (the current phase) is away from optimal current advance line 42 to the left in the figure (toward an advance side). Since the current vector is not located on optimal current advance line 42, loss in AC electric motor M1 increases in rectangular wave voltage control.

In contrast, transition from rectangular wave voltage control to PWM control is indicated when current phase ϕi is smaller than prescribed ϕth (a reference value) during rectangular wave voltage control.

Figure 5:
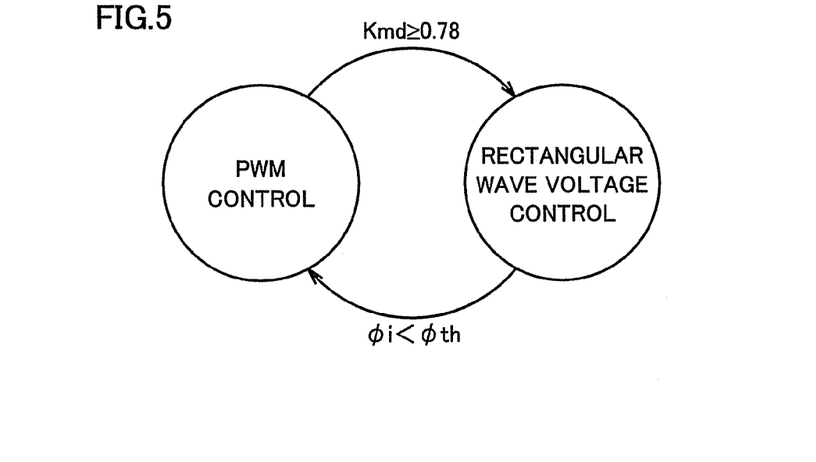
FIG. 5 is a diagram illustrating switching of a control scheme in correspondence with a motor condition.

Mode switching between PWM control and rectangular wave voltage control will be described with reference to FIG. 5. During application of sine wave PWM or overmodulation PWM control, a degree of modulation Kmd is calculated from voltage command values Vd#, Vq# on the d-axis and the q-axis which will be described later and system voltage VH, with the following equation 1.

$$Kmd=(Vd\#^2 \pm Vq\#^2)^{1/2}/VH \quad (1)$$

When degree of modulation Kmd is greater than 0.78, transition to a rectangular wave voltage control mode is indicated.

On the other hand, when current phase ϕi is smaller than reference value ϕth with decrease in output torque during rectangular wave control, transition to a PWM control mode is indicated.

Figure 6A:
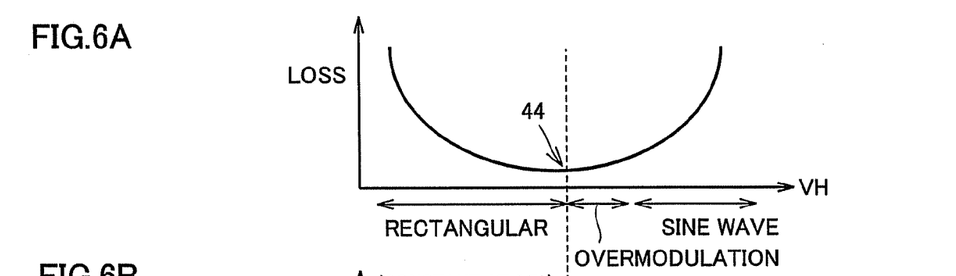
FIGS. 6A to 6C are diagrams showing characteristics of loss in the overall motor drive system.
Figure 6B:
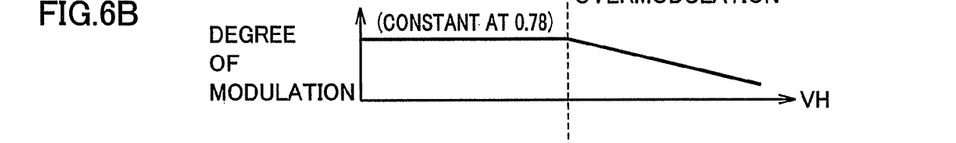
Figure 6C:
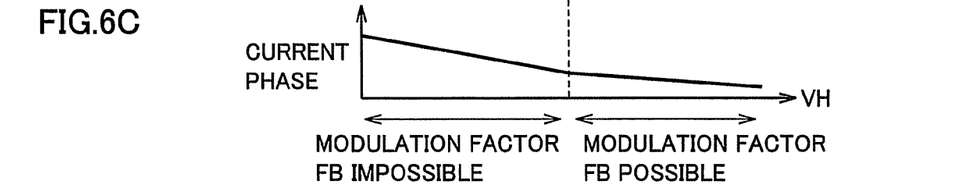

Energy loss in sine wave PWM control, overmodulation PWM control, and rectangular wave voltage control can vary in accordance with system voltage VH, as shown in FIG. 6A. FIGS. 6A to 6C show a behavior of the control system under such a condition that output (a product of a rotation speed and torque) from AC electric motor M1 is constant and only system voltage VH is varied.

FIG. 6A shows relation between system voltage VH and total loss in the control system throughout three control modes. FIG. 6B shows relation between system voltage VH and degree of modulation Kmd. FIG. 6C shows relation between system voltage VH and a motor current phase.

Referring to FIGS. 6A to 6C, in a region where sine wave PWM control and overmodulation PWM control are applied, loss decreases as system voltage VH is lower and a degree of modulation is raised. Then, since loss in boost converter 12 and inverter 14 is minimized at an operation point 44 at which rectangular wave voltage control is applied, loss in the overall system is also minimized.

Since a degree of modulation is fixed at 0.78 in a region in which rectangular wave voltage control is applied, voltage phase ϕv for obtaining the same output is greater as system voltage VH is lowered. Accordingly, as described previously, with increase in field-weakening current, the current phase is away from optimal current advance line 42. Therefore, system loss increases due to increase in loss in AC electric motor M1. Namely, in rectangular wave voltage control, as system voltage VH lowers, total loss in the system will increase.

In contrast, when PWM control is applied by raising system voltage VH, the current phase of AC electric motor M1 can be controlled along optimal current advance line 42. When AC electric motor M1 is operated under PWM control, however, loss in AC electric motor M1 can be lowered while loss in inverter 14 increases due to increase in the number of times of switching.

Therefore, it is when rectangular wave voltage control is applied and a current phase of AC electric motor M1 is in the vicinity of optimal current advance line 42 that loss in the overall control system including AC electric motor M1 is minimized. Namely, system voltage VH is preferably set such that such a state is established.

Figure 7:
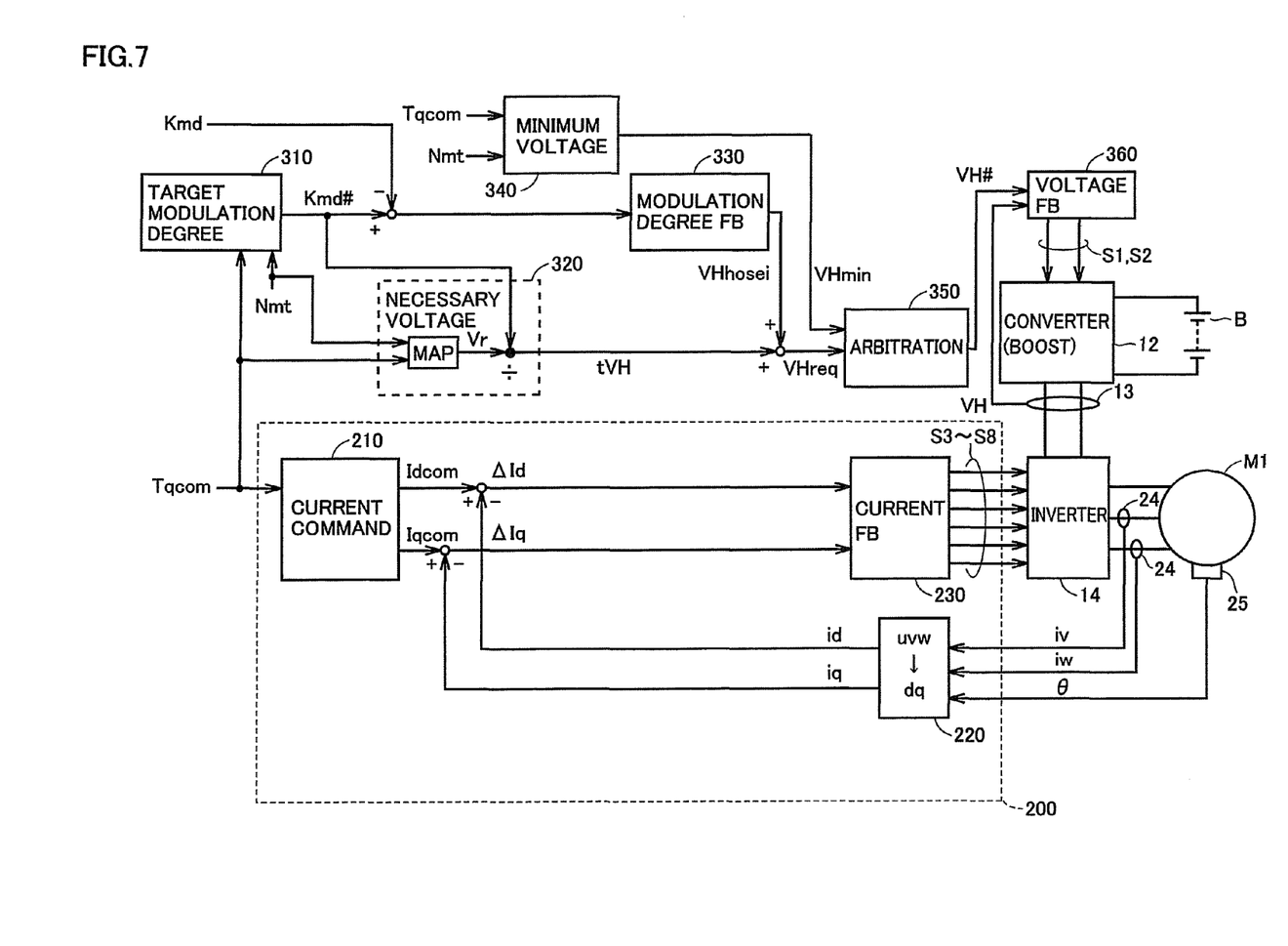
FIG. 7 is a control block diagram in a sine wave PWM control scheme and an overmodulation PWM control scheme.

Specific processing in sine wave PWM control and overmodulation PWM control will be described with reference to FIG. 7. FIG. 7 is a functional block diagram illustrating a control configuration in PWM control in the control system for the AC electric motor according to the embodiment of the present invention. Each functional block for motor control shown in block diagrams described below and represented by FIG. 7 is implemented by hardware or software processing by control device 30.

Referring to FIG. 7, a PWM control unit 200 includes a current command generation portion 210, a conversion portion 220, and a current feedback portion 230.

Current command generation portion 210 generates a d-axis current command value Idcom and a q-axis current command value Iqcom in accordance with torque command value Tqcom for AC electric motor M1, in accordance with the map created in advance or the like.

Conversion portion 220 converts three-phase motor currents iu, iv, iw which flow in AC electric motor M1 to two-phase currents id, iq on the d-axis and the q-axis through coordinate conversion using a rotor rotation angle θ, and outputs the same. Specifically, a U-phase current iu (iu=−iv−iw) is calculated from a V-phase current iv and a W-phase current iw detected by current sensor 24. Actual d-axis current id and q-axis current iq are calculated based on these currents iu, iv, iw, in accordance with angle of rotation θ detected by rotation angle sensor 25.

Current feedback portion 230 receives input of a difference ΔId (ΔId=Idcom−id) between d-axis current command value Idcom and calculated actual d-axis current id and a difference ΔIq (ΔIq=Iqcom−iq) between q-axis current command value Iqcom and calculated actual q-axis current iq. Current feedback portion 230 performs PI (proportional integration) operation with prescribed gain for each of d-axis current difference ΔId and q-axis current difference ΔIq to thereby find control deviation, and generates d-axis voltage command value Vd# and q-axis voltage command value Vq# in accordance with this control deviation. In addition, current feedback portion 230 converts d-axis voltage command value Vd# and q-axis voltage command value Vq# to voltage commands of respective phases Vu, Vv, Vw of the U-phase, the V-phase, the W-phase, through coordinate conversion (two phases three phases) using angle of rotation θ of AC electric motor M1 and generates switching control signals S3 to S8 in accordance with voltage command values of respective phases Vu, Vv, Vw. A pseudo sine wave voltage is generated in each phase of AC electric motor M1, through a switching operation by inverter 14 in response to switching control signals S3 to S8.

Control device 30 for the motor drive system according to the embodiment of the present invention further includes a target modulation degree calculation portion 310, a necessary voltage calculation portion 320, a modulation degree feedback portion 330, a minimum voltage calculation portion 340, an arbitration portion 350, and a voltage feedback portion 360.

Target modulation degree calculation portion 310, necessary voltage calculation portion 320, and modulation degree feedback portion 330 are functional blocks for calculating a requested voltage VHreq as an output voltage from boost converter 12 for maintaining degree of modulation Kmd of inverter 14 at a target degree of modulation Kmd#.

More specifically, target modulation degree calculation portion 310 calculates target degree of modulation Kmd# in accordance with a map having target torque (torque command value Tqcom) of AC electric motor M1 and rotation speed Nmt of AC electric motor M1 as parameters.

Necessary voltage calculation portion 320 calculates a necessary voltage tVH as an output voltage from boost converter 12 necessary for realizing target torque (torque command value Tqcom) from target torque (torque command value Tqcom). By way of example, necessary voltage calculation portion 320 calculates necessary voltage tVH in accordance with a map having target degree of modulation Kmd# calculated by target modulation degree calculation portion 310, target torque (torque command value Tqcom), and rotation speed Nmt of AC electric motor M1 as parameters. More specifically, by way of example, necessary voltage tVH is calculated by dividing a voltage Vr found from torque command value Tqcom and rotation speed Nmt by referring to the map by target degree of modulation Kmd#. Voltage Vr is a voltage applied to AC electric motor M1 (an effective value of a line voltage).

Modulation degree feedback portion 330 finds a target system voltage by calculating a ratio of actual degree of modulation Kmd to target degree of modulation Kmd# (Kmd/Kmd#) and multiplying this ratio by current system voltage VH. In addition, a value ΔVH obtained by subtracting current system voltage VH from this target system voltage and an integration value ∫ΔVH thereof are calculated. A proportional term KpΔVH and an integral term Ki∫ΔVH are calculated by multiplying value ΔVH and integration value ∫ΔVH by proportional gain Kp and integration gain Ki. Modulation degree feedback portion 330 calculates the sum of these proportional term KpΔVH and integral term Ki∫ΔVH as a correction voltage VHhosei.

The sum of necessary voltage tVH and correction voltage VHhosei is input as requested voltage VHreq to arbitration portion 350.

Minimum voltage calculation portion 340 has a function for calculating from the target torque, a minimum voltage VHmin as a minimum value for the output voltage from boost converter 12 which can realize target torque (torque command value Tqcom) of AC electric motor M1. Minimum voltage calculation portion 340 calculates minimum voltage VHmin above in accordance with a map having the target torque (torque command value Tqcom) and rotation speed Nmt of AC electric motor M1 as parameters.

Arbitration portion 350 selects as voltage command value VH#, a greater one of requested voltage VHreq and minimum voltage VHmin.

Based on voltage command value VH# thus set and current system voltage VH, voltage feedback portion 360 generates switching control signals S1, S2 such that an output voltage from boost converter 12 attains to voltage command value VH#, in accordance with a prescribed PWM control scheme.

Figure 8:
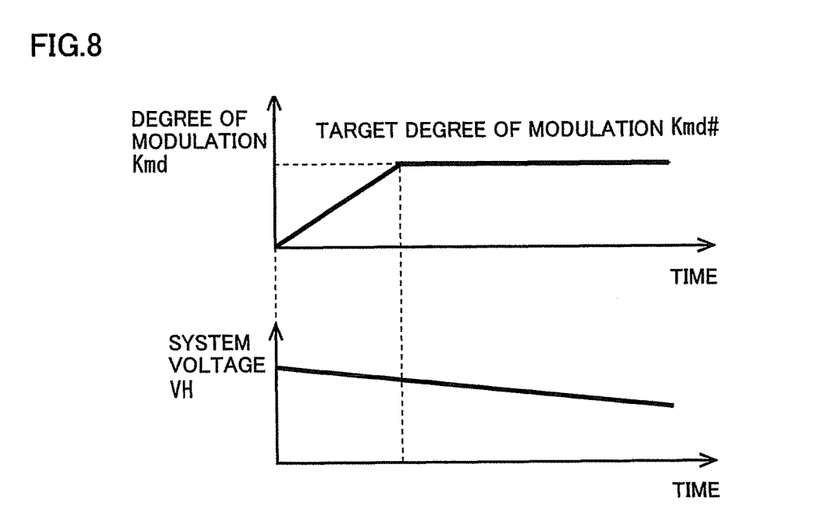
FIG. 8 is a diagram showing a degree of modulation of an inverter and a system voltage (an output voltage from a converter) VH when only feedback control of a degree of modulation is adopted.

As described above, sine wave PWM control and overmodulation PWM control include feedback control for bringing an actual degree of modulation to a target degree of modulation. Therefore, in feedback control of a degree of modulation, when an actual degree of modulation is lower than a target degree of modulation as shown in FIG. 8, system voltage VH may be lowered in order to raise the actual degree of modulation. Consequently, a drive voltage for AC electric motor M1 may lower and maximum torque which AC electric motor M1 can output may lower. In this case, acceleration desired by a driver cannot be realized.

Figure 9:
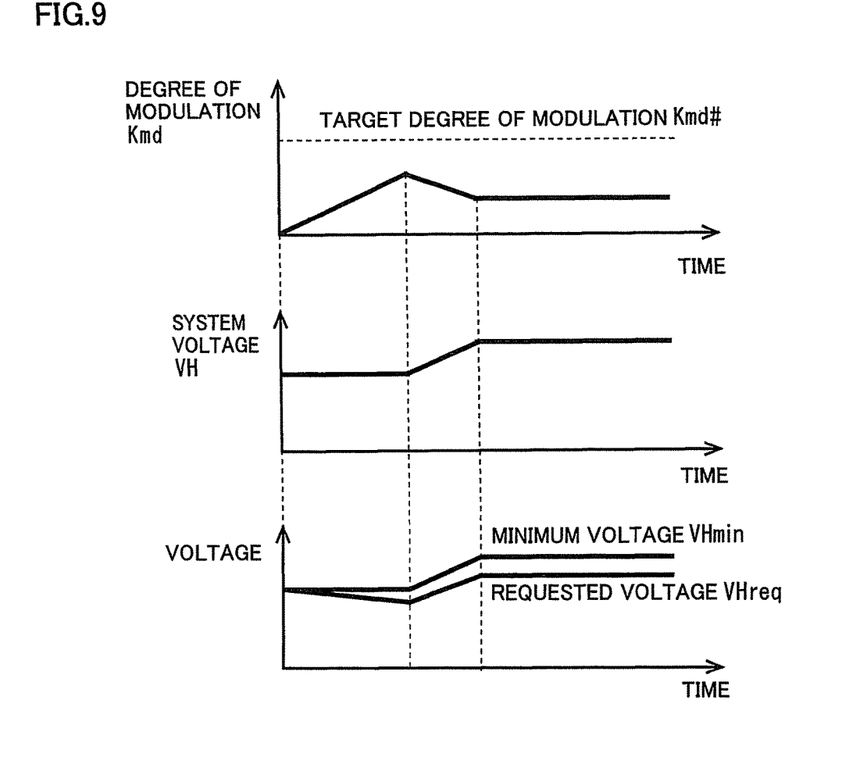
FIG. 9 is a diagram showing a degree of modulation of the inverter controlled by a control device according to an embodiment of the present invention and system voltage VH.

In the present embodiment, however, as shown in FIG. 9, when minimum voltage VHmin generated from torque command value Tqcom is higher than requested voltage VHreq generated during feedback control of a degree of modulation, system voltage VH can be raised based on minimum voltage VHmin. Therefore, insufficient output torque from AC electric motor M1 can be suppressed.

When minimum voltage VHmin is higher than requested voltage VHreq, actual degree of modulation Kmd can inevitably be different from target degree of modulation Kmd#, and hence next requested voltage VHreq is preferably calculated in consideration of this fact.

Then, in the present embodiment, when minimum voltage VHmin is higher than requested voltage VHreq, next requested voltage VHreq is calculated by using a value calculated from minimum voltage VHmin equal to voltage command value VH# as an integral term VHi.

More specifically, modulation degree feedback portion 330 calculates as integral term VHi, a value obtained by subtracting necessary voltage tVH and proportional term KpΔVH from minimum voltage VHmin which is voltage command value VH#, in accordance with the following equation 2.

$$VHi = VHmin - tVH - Kp\Delta VH \qquad (2)$$

Modulation degree feedback portion 330 calculates next correction voltage VHhosei by using integral term VHi calculated in accordance with the equation 2. Next requested voltage VHreq is calculated by adding this correction voltage VHhosei to necessary voltage tVH calculated next.

A control block diagram during the rectangular wave control scheme will be described hereinafter with reference to FIG. 10. It is noted that a degree of modulation is fixed during the rectangular wave control scheme as described above and hence feedback control of a degree of modulation as included in PWM control is not implemented.

Figure 10:
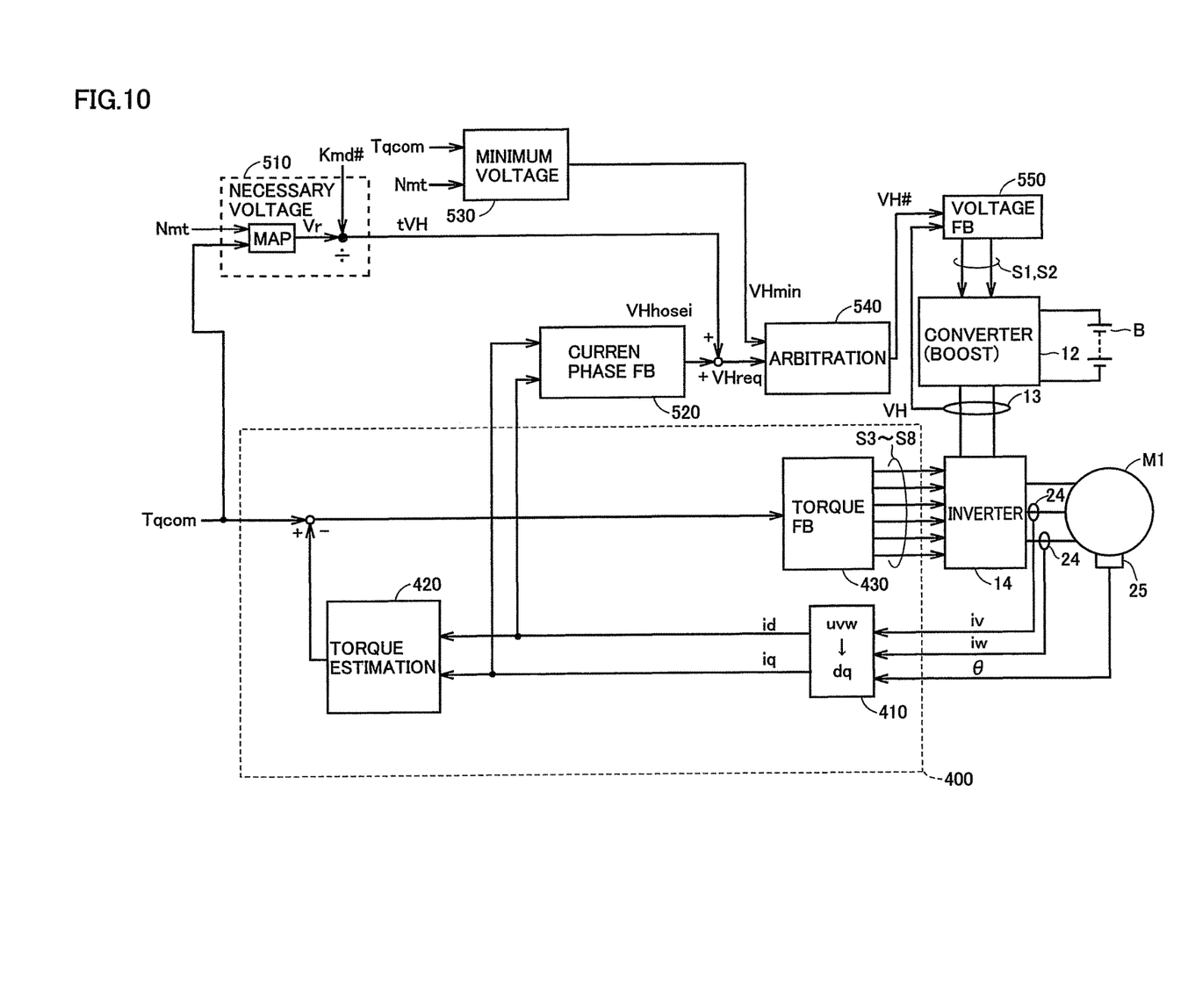
FIG. 10 is a control block diagram during a rectangular wave control scheme.

Referring to FIG. 10, a rectangular wave control block 400 includes a conversion portion 410, a torque estimation portion 420, and a torque feedback portion 430.

Conversion portion 410 converts three-phase motor currents iu, iv, iw which flow in AC electric motor M1 to two-phase currents id, iq on the d-axis and the q-axis through coordinate conversion using rotor rotation angle θ, and outputs the same. Specifically, U-phase current iu (iu=−iv−iw) is calculated from V-phase current iv and W-phase current iw detected by current sensor 24. D-axis current id and q-axis current iq are generated based on these currents iu, iv, iw, in accordance with angle of rotation θ detected by rotation angle sensor 25.

Torque estimation portion 420 estimates actual torque Tq of AC electric motor M1 from d-axis current id and q-axis current iq in accordance with the map defining relation between torque and a current determined in advance.

Torque feedback portion 430 receives input of torque deviation ΔTq (ΔTq=Tqcom−Tq) from torque command value Tqcom. Torque feedback portion 430 performs PI operation with prescribed gain for torque deviation ΔTq to thereby find control deviation, and sets a phase φv of a rectangular wave voltage in accordance with the found control deviation. Specifically, during generation of positive torque (Tqcom>0), a voltage phase is advanced when torque is insufficient, whereas a voltage phase is retarded when torque is excessive. During generation of negative torque (Tqcom<0), a voltage phase is retarded when torque is insufficient, whereas a voltage phase is advanced when torque is excessive.

In addition, torque feedback portion 430 generates voltage command values (rectangular wave pulses) of respective phases Vu, Vv, Vw in accordance with set voltage phase φv, and generates switching control signals S3 to S8 in accordance with voltage command values of respective phases Vu, Vv, Vw. As inverter 14 performs a switching operation in accordance with switching control signals S3 to S8, a rectangular wave pulse in accordance with voltage phase φv is applied as a voltage of each phase of the motor.

Thus, during the rectangular wave control scheme, motor torque control can be carried out with feedback control of torque (electric power).

Control device 30 for the motor drive system according to the embodiment of the present invention further includes a necessary voltage calculation portion 510, a current phase feedback portion 520, a minimum voltage calculation portion 530, and an arbitration portion 540.

Necessary voltage calculation portion 510 calculates necessary voltage tVH as an output voltage from boost converter 12 necessary for realizing target torque (torque command value Tqcom) from target torque (torque command value Tqcom). By way of example, necessary voltage calculation portion 510 calculates necessary voltage tVH in accordance with the map having prescribed target degree of modulation Kmd#, target torque (torque command value Tqcom), and rotation speed Nmt of AC electric motor M1 as parameters. More specifically, by way of example, necessary voltage tVH is calculated by dividing voltage Vr by target degree of modulation Kmd#. Voltage Vr is a voltage applied to AC electric motor M1 (an effective value of a line voltage) and is found from torque command value Tqcom and rotation speed Nmt by referring to the map.

Figure 11:
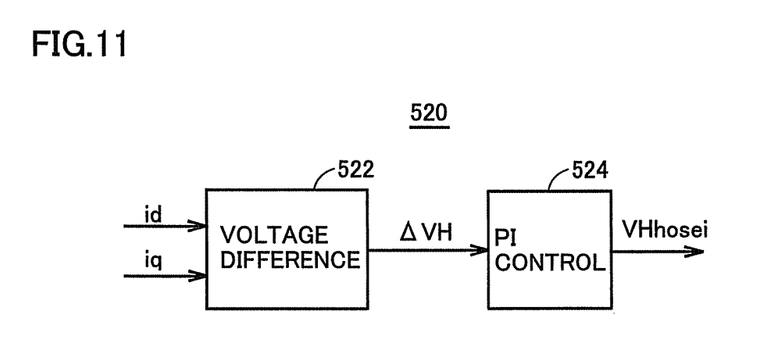
FIG. 11 is a control block diagram of a current phase feedback portion in FIG. 10.
Figure 12:
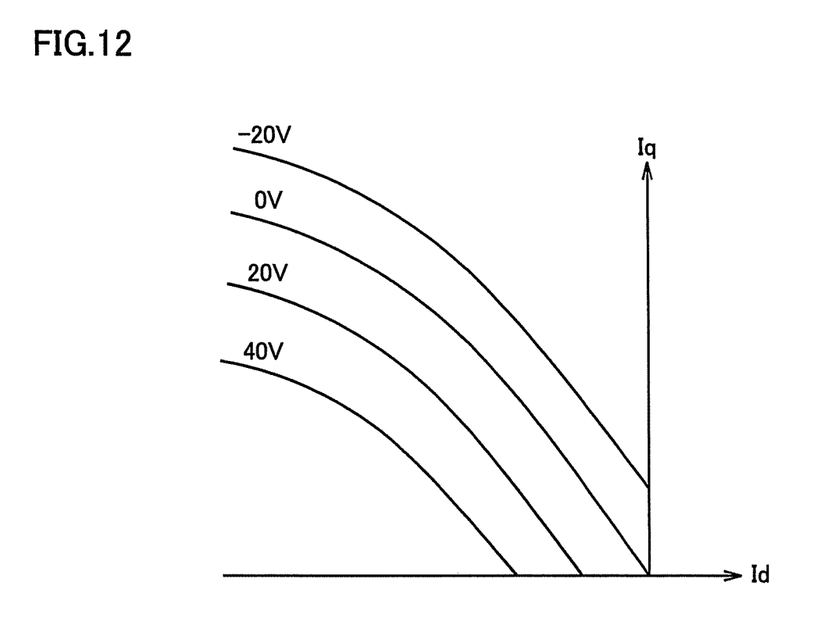
FIG. 12 is a diagram showing a map used for calculation of a voltage difference ΔVH by the current phase feedback portion in FIG. 10.

Current phase feedback portion 520 calculates correction value VHhosei for system voltage VH in accordance with d-axis current id and q-axis current iq generated by conversion portion 410. Current phase feedback portion 520 includes a voltage difference calculation portion 522 and a PI control unit 524 as shown in FIG. 11. Voltage difference calculation portion 522 calculates a voltage difference ΔVH in accordance with a map having d-axis current id and q-axis current iq as parameters, as shown in FIG. 12.

Referring back to FIG. 11, PI control unit 524 calculates proportional term KpΔVH and integral term Ki∫ΔVH by multiplying voltage difference ΔVH and integration value thereof ∫ΔVH by proportional gain Kp and integration gain Ki, respectively. PI control unit 524 calculates the sum of these proportional term KpΔVH and integral term Ki∫ΔVH as correction voltage VHhosei.

Referring back to FIG. 10, the sum of necessary voltage tVH and correction voltage VHhosei is input as requested voltage VHreq to arbitration portion 540.

Minimum voltage calculation portion 530 is a function for calculating from the target torque, minimum voltage VHmin as the minimum value for the output voltage from boost converter 12 which can realize target torque (torque command value Tqcom) of AC electric motor M1. Minimum voltage calculation portion 530 calculates minimum voltage VHmin above in accordance with the map having the target torque (torque command value Tqcom) and rotation speed Nmt of AC electric motor M1 as the parameters.

Arbitration portion 540 selects as voltage command value VH#, a greater one of requested voltage VHreq and minimum voltage VHmin.

Based on voltage command value VH# thus set and current system voltage VH, a voltage feedback portion 550 generates switching control signals S1, S2 in accordance with a prescribed PWM control scheme such that an output voltage from boost converter 12 attains to a voltage command value VH#.

When minimum voltage VHmin is higher than requested voltage VHreq, even while rectangular wave control is carried out, current phase feedback portion 520 calculates integral term VHi of correction voltage VHhosei in accordance with the equation 2 described above, as in during PWM control. Therefore, next requested voltage VHreq is calculated by using a value obtained by subtracting necessary voltage tVH and proportional term KpΔVH from minimum voltage VHmin, which is voltage command value VH#, as integral term VHi.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device for a vehicle incorporating a converter converting and outputting a voltage, an inverter converting DC power output from said converter to AC power, and a motor driven by AC power supplied from said inverter, comprising:

a first calculation unit configured to calculate a requested voltage as an output voltage from said converter for bringing a degree of modulation of said inverter closer to a prescribed target degree of modulation;

a second calculation unit configured to calculate, from a target torque of said motor, a minimum voltage as a minimum value for the output voltage from said converter which realizes the target torque of said motor; and a control unit configured to use the requested voltage from said first calculation unit and the minimum voltage from the second calculation unit to control said converter such that the output voltage from said converter is closer to a value which is greater than one of said requested voltage and said minimum voltage.

2. The control device for a vehicle according to claim 1, wherein said first calculation unit, during a pulse width modulation control, repeatedly calculates said requested voltage by adding a proportional term and an integral term of a feedback control of a deviation obtained by subtracting a present output voltage from a target system voltage being a product of the present output voltage and a ratio of a present degree of modulation of said inverter to the target degree of modulation, to a necessary voltage calculated from the target torque of said motor as the output voltage from said converter necessary for realizing the target torque of said motor.

3. The control device for a vehicle according to claim 2, wherein
said first calculation unit calculates a subsequent requested voltage by using a value obtained by subtracting said necessary voltage and said proportional term from said minimum voltage as said integral term, when said minimum voltage is higher than said requested voltage.

4. The control device for a vehicle according to claim 1, wherein
said first calculation unit, during a rectangular control, repeatedly calculates said requested voltage by adding a proportional term and an integral term of a feedback control of a voltage difference calculated from a d-axis current and a q-axis current of said motor in accordance with a prescribed map set on a two-dimensional coordinates of the d-axis current and the q-axis.

5. The control device for a vehicle according to claim 4, wherein
said first calculation unit calculates a subsequent requested voltage by using a value obtained by subtracting said necessary voltage and said proportional term from said minimum voltage as said integral term, when said minimum voltage is higher than said requested voltage.

6. A vehicle comprising:
a converter converting and outputting a voltage;
an inverter converting DC power output from said converter to AC power;
a motor driven by AC power supplied from said inverter; and
the control device according to claim 1.

7. A vehicle comprising:
a converter converting and outputting a voltage;
an inverter converting DC power output from said converter to AC power;
a motor driven by AC power supplied from said inverter; and
the control device according to claim 2.

8. A vehicle comprising:
a converter converting and outputting a voltage;
an inverter converting DC power output from said converter to AC power;
a motor driven by AC power supplied from said inverter; and
the control device according to claim 3.

9. A vehicle comprising:
a converter converting and outputting a voltage;
an inverter converting DC power output from said converter to AC power;
a motor driven by AC power supplied from said inverter; and
the control device according to claim 4.

10. A vehicle comprising:
a converter converting and outputting a voltage;
an inverter converting DC power output from said converter to AC power;
a motor driven by AC power supplied from said inverter; and
the control device according to claim 5.

* * * * *

UNITED STATES PATENT AND TRADEMARK OFFICE
CERTIFICATE OF CORRECTION

PATENT NO. : 9,656,554 B2
APPLICATION NO. : 14/136464
DATED : May 23, 2017
INVENTOR(S) : Morii et al.

Page 1 of 1

It is certified that error appears in the above-identified patent and that said Letters Patent is hereby corrected as shown below:

At Column 07, Line 50, change the content from:
"$Kmd=(Vd\#^2 \pm Vq\#^2)^{½}/VH$"
To:
"$Kmd=(Vd\#^2 + Vq\#^2)^{½}/VH$"

Signed and Sealed this
Thirty-first Day of July, 2018

Andrei Iancu
*Director of the United States Patent and Trademark Office*